United States Patent
Digiacomo

(10) Patent No.: US 6,652,006 B1
(45) Date of Patent: Nov. 25, 2003

(54) FLUID TRANSFER DEVICE

(76) Inventor: Frank Digiacomo, 680 Main St., Little Falls, NJ (US) 07424

( * ) Notice: Subject to any disclaimer, the term of this patent is extended or adjusted under 35 U.S.C. 154(b) by 10 days.

(21) Appl. No.: 09/699,629

(22) Filed: Oct. 31, 2000

(51) Int. Cl.[7] .............................................. F16L 55/00
(52) U.S. Cl. ........................ 285/92; 285/114; 285/353; 285/403
(58) Field of Search ........................... 285/92, 114, 353, 285/354, 403

(56) References Cited

U.S. PATENT DOCUMENTS

| | | | | |
|---|---|---|---|---|
| 2,898,940 A | * | 8/1959 | Cole, Jr. ....................... | 285/114 |
| 3,527,481 A | * | 9/1970 | Lewis .......................... | 285/114 |
| 3,647,246 A | * | 3/1972 | Burtis .......................... | 285/114 |
| 4,927,187 A | * | 5/1990 | Sanford et al. ................ | 285/92 |
| 5,188,398 A | * | 2/1993 | Parimore, Jr. ................. | 285/92 |
| 5,299,837 A | * | 4/1994 | Lagier ......................... | 285/114 |
| 5,348,349 A | * | 9/1994 | Sloane ......................... | 285/92 |
| 5,507,533 A | * | 4/1996 | Mumma ....................... | 285/114 |
| 5,882,044 A | * | 3/1999 | Sloane ......................... | 285/92 |
| 6,135,509 A | * | 10/2000 | Billington, III .............. | 285/92 |
| 6,142,535 A | * | 11/2000 | Nishio et al. .................. | 285/92 |

OTHER PUBLICATIONS

Earl's Performance Products Australia Pty Ltd., http://www.ozemail.com.au/~earls/, p. 1.
Earl's Adaptors, http://www.ozemail.com.au/~earls/adaptors.htm, p. 1.
Earl's Hoses, http://www.ozemail.com.au/~earls/hoses.htm, pp. 1–2.
Earl's Hose Ends, http://www.ozemail.com.au/~earls/hose_end.htm, pp. 1–2.
Earl's Speed Seal Hose Ends, http://www.ozemail.com.au/~earls/earls30.jpg, p. 1.
Earl's Auto Fit Hose Ends, http://www.ozemail.com.au/~earls/earls32.jpg, p. 1.
Earl's Swivel Seal Hose Ends, http://www.ozemail.com.au/~earls/earls31.jpg, p. 1.
Earl's Auto Mate Hose Ends, http://www.ozemail.com.au/~earls/earls36.jpg, p. 1.
Earl's Super Stock Hose Ends, http://www.ozemail.com.au/~earls/earls34.jpg, p. 1.
Earl's Econo Fit Hose Ends, http://www.ozemail.com.au/~earls/earls33.jpg, p. 1.
Earl's Quick Fit Hose Ends, http://www.ozemail.com.au/~earls/earls35.jpg, p. 1.
Aeroquip Corporation, Aeroquip Catalog, Hose Fittings, pp. 65–173; Connectors, pp. 177–222; Flexmaster® Joints, pp. 241–256; and Assembly Tips, pp. 368–402, 5/99.

* cited by examiner

Primary Examiner—Lynne H. Browne
Assistant Examiner—James M. Hewitt
(74) Attorney, Agent, or Firm—Fish & Richardson P.C.

(57) ABSTRACT

A fluid transfer device includes a first section and a second section. The first section includes a first flange with a first fastener on an outer diameter of the adapter. The fluid transfer device includes a coupler secured to the second section to rotate independently of the second section and to mate with an end of the first section. The coupler includes a second flange with a second fastener on an outer diameter of the coupler. A support couples to the first and second fasteners of the flanges to secure the first section to the second section and to prevent relative rotation of the flanges.

21 Claims, 8 Drawing Sheets

US 6,652,006 B1

FLUID TRANSFER DEVICE

TECHNICAL FIELD

This invention relates to fluid transfer devices.

BACKGROUND

Fluid transfer devices are used in transportation equipment, such as airplanes, marine crafts, locomotives, or automobiles, to transfer fluids such as fuel, oil, or water.

SUMMARY

In one general aspect, a fluid transfer device includes first and second section. The first section includes a first flange with a first fastener on an outer diameter of the first section. A coupler is secured to the second section to rotate independently of the second section and to mate with an end of the first section. The coupler includes a second flange with a second fastener on an outer diameter of the coupler. The fluid transfer device includes a support that couples the first and second fasteners of the flanges to prevent relative rotation of the flanges to secure the first section to the second section.

Implementations may include one or more of the following features. For example, the first section may include an adapter that has an end that mates with the coupler. The end of the adapter may include threads that match threads of the coupler. The second section may include a barb connector in which a hose may be connected.

The first fastener may include a clearance hole through the first flange. The second fastener may include a clearance hole through the first flange.

The first fastener may include a clip or the second fastener may include a clip. The first fastener may include a notch or the second fastener may include a notch. The support may include a wire or cable.

The first flange may include an additional first fastener and the second flange may include an additional second fastener. The fluid transfer device may include an additional support that couples to the additional first and second fasteners of the flanges to help secure the first section to the second section.

The fluid transfer device may be used in any high-pressure or low-pressure environment.

The details of one or more embodiments of the invention are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
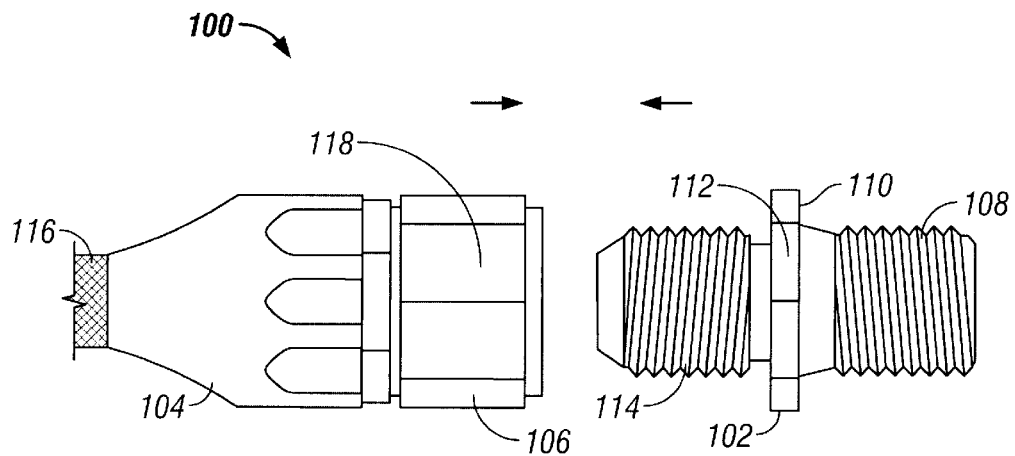
FIG. 1 is a side view of a disassembled fluid transfer device.

Referring to FIG. 1, a device 100 for transferring fluid such as fuel, oil, or water may be used in transportation equipment such as airplanes, marine crafts, locomotives, or automobiles. The device 100 includes an adapter 102, a barb connector 104, and a coupler 106.

The adapter 102 includes an external thread 108 (for example, a tapered pipe thread) that mates with an internal thread on a fluid assembly (not shown). A nut 110 with wrench flats 112 is used for securing the adapter 102 to the barb connector 104. The adapter 102 also includes an external thread 114 (for example, a straight thread or an aircraft national thread) that mates with an internal thread (not shown) of the coupler 106. In oil systems, the external thread 108 may install into an oil pan, an oil pump, or an oil storage tank. In fuel systems, the external thread 108 may install into a fuel pump or a carburetor. In cooling systems, the external thread 108 may install into a water pump, cylinder head, or engine block.

The barb connector 104 joins with the coupler 106 such that the coupler 106 rotates independently of the barb connector 104. A hose 116 that carries the fluid fits into the barb connector 104. In some designs, the barb connector 104 is reusable, and the hose 116 may be removed and re-inserted into the barb connector 104. In other designs, the barb connector 104 is permanent, and thus may not be used again after the hose 116 is removed. During assembly, a nut 118 external to the coupler 106 is tightened relative to the nut 110 of the adapter 102 to secure the hose 116 to the barb connector 104, the barb connector 104 to the adapter 102, and the barb connector 104 to the coupler 106 to permit fluid flow through the device 100.

The adapter 102, barb connector 104, and coupler 106 may be made of any suitable metal. Examples of suitable metals include iron, nickel, or aluminum alloys. In high-pressure applications, the various parts of the device 100 may be manufactured with steel or steel alloys. In low-pressure application, the various parts of the device 100 may be manufactured with aluminum or aluminum alloys. The selection of the metal may be based on the type of fluid that will flow through the device 100 and the type of transportation equipment in which the device 100 will be used.

Manufacturers of the adapter 102 often recommend that no thread sealer be applied to the external thread 114 because residue from a thread sealer left on the external thread after the thread sealer is removed would tend to bind the external thread and prevent a tight seal. Manufacturers recommend using a thread sealer such as Teflon tape on the threads 108. However, because the coupler 106 spins independently of the barb connector 104 when disassembled, vibrations in the device 100 during fluid flow operation may cause the coupler 106 to loosen, which may cause damage to the transportation equipment and may cause a potentially dangerous situation.

Figure 2A:
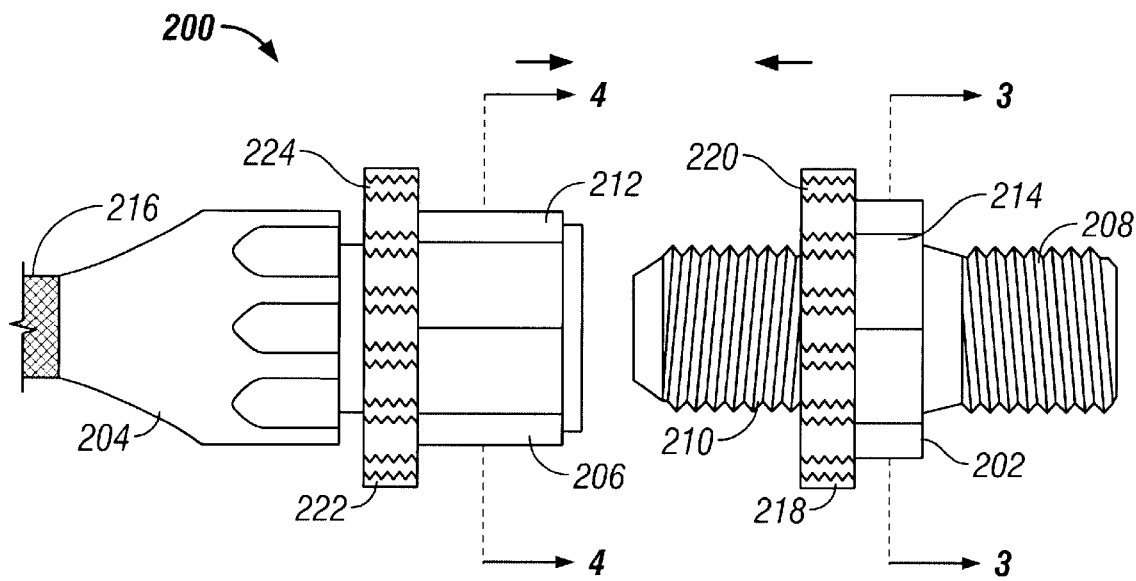
FIGS. 2A and 2B are side views of, respectively, a disassembled and assembled fluid transfer device.
Figure 2B:
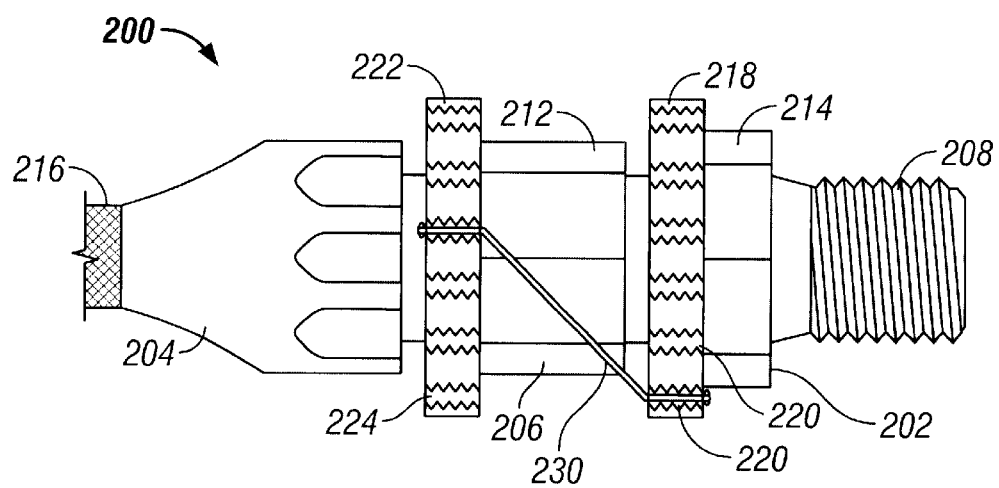

Referring to FIGS. 2A and 2B, an improved fluid transfer device 200 is designed to reduce the likelihood of a loose-fitting coupler. The device 200 includes an adapter 202, a barb connector 204 designed like the barb connector 104, and a coupler 206. Like the barb connector 104, the barb connector 204 joins with the coupler 206 such that the coupler 206 rotates independently of the barb connector 204. Similar to the adapter 102 discussed above, adapter 202 includes external threads 208 that mate with a female device (for example, a pipe) to permit fluid flow through the device 200. Additionally, the adapter 202 has external threads 210 that mate with internal threads of the coupler 206. Nut 212 is formed on the coupler 206 and nut 214 is formed on the adapter 202 to facilitate tightening of the coupler 206 relative to the adapter 202 to secure the barb connector 204 to the adapter 202 and a fluid hose 216 to the barb connector 204, as shown in the partially-assembled device 200 in FIG. 2B.

Figure 3:
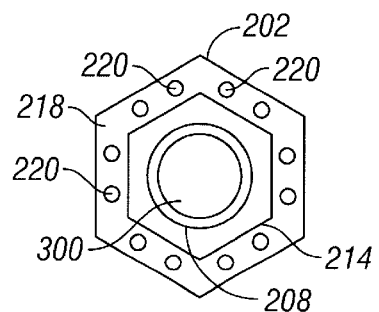
FIGS. 3 and 4 are cross sectional views of components of the fluid transfer device of FIGS. 2A and 2B taken along sections 3—3 and 4—4.
Figure 4:
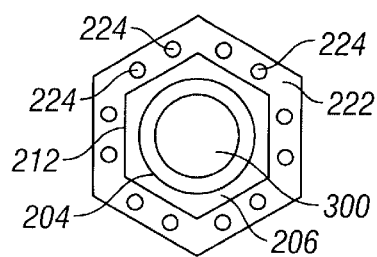

Referring also to FIGS. 3 and 4, the adapter 202 includes a flange 218 with one or more clearance holes 220. Similarly, a flange 222 is formed in the coupler 206 and one or more clearance holes 224 are formed in the flange 222.

The adapter 202, barb connector 204, and coupler 206 may each be made of suitable materials (for example, alloys of iron and aluminum). The material selected may depend on the fluid that will flow through the device 200 or the type of transportation equipment in which the device 200 will be used. Other factors that may affect the type of material used in the parts of the device 200 include operating conditions such as temperature and pressure.

The device 200 may be designed for use in fluid systems of different sizes and, therefore, the size of the device 200 may be adjusted depending on the size of the fluid system. Typical sizes of prior art fluid transfer devices 100 include sizes #5, #6, #8, #10, #12, #14, #16, #18, and #20 using the English system of units. The device 200 may be designed for any size fluid system, including all prior known sizes and metric sizes.

One or more supports 230 are used to secure the coupler 206 to the adapter 202. These supports 230 may be rigid or flexible, but they should be durable enough to withstand vibrations and other operating condition extremes. The supports 230 may be made of wires, cable, rope materials, rubber material, or any suitably durable material. Additionally, the supports 230 should be long enough to extend from the adapter 202 to the coupler 206 when the adapter 202 is joined to the coupler 206. Safety wire is a suitable durable material that may be used for supports 230.

After the nuts 214 and 212 are tightened and the adapter 202 and coupler 206 are joined, the support 230 is drawn through a clearance hole 220 of the flange 218 and a clearance hole 224 of the flange 222. Accordingly, the support 230 should have a diameter less than the diameter of the clearance holes 220, 224 to fit through each of the clearance holes. After the support 230 is drawn through the clearance holes 220, 224, the support 230 is pulled until there is no slack and is attached using any suitable method, such as, for example, knots, or clips. In this way, the support 230 is tautly secured through the clearance holes 220, 224 to prevent movement of the coupler 206 relative to the adapter 202. When assembled, fluid flows through a passage 300 of the device 200 and movement of the coupler 206 relative to the adapter is reduced.

Figure 5:
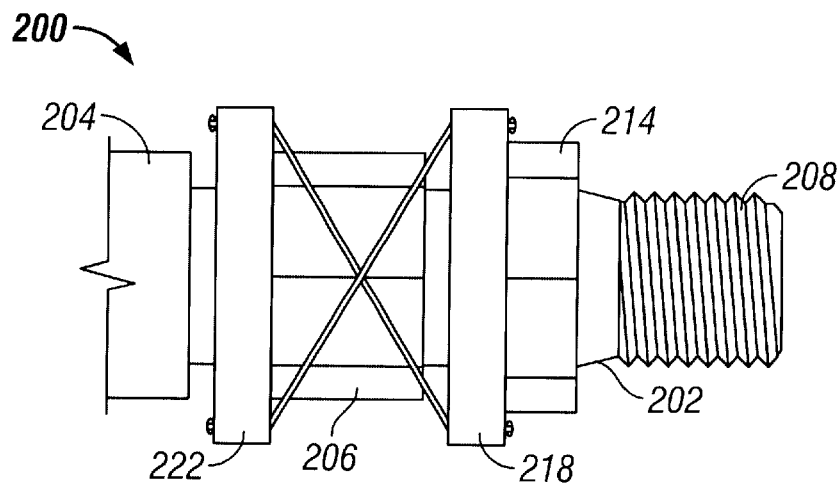
FIGS. 5–7 are side views of support patterns used in the fluid transfer device of FIGS. 2A and 2B.
Figure 6:
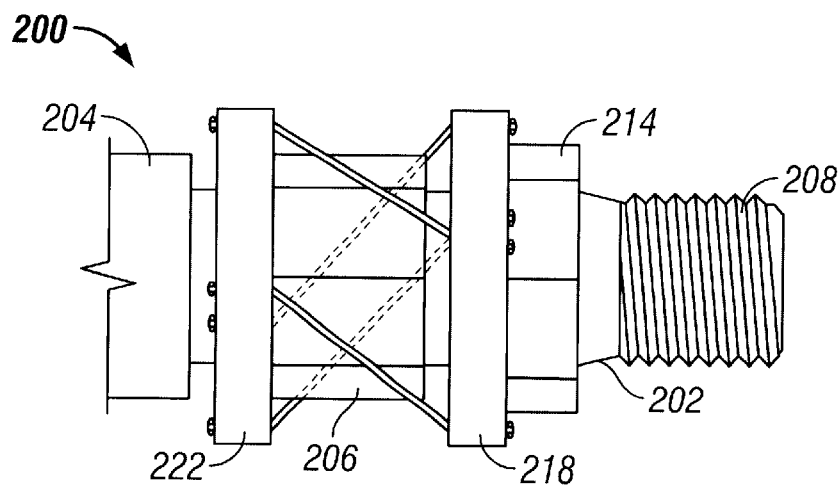
Figure 7:
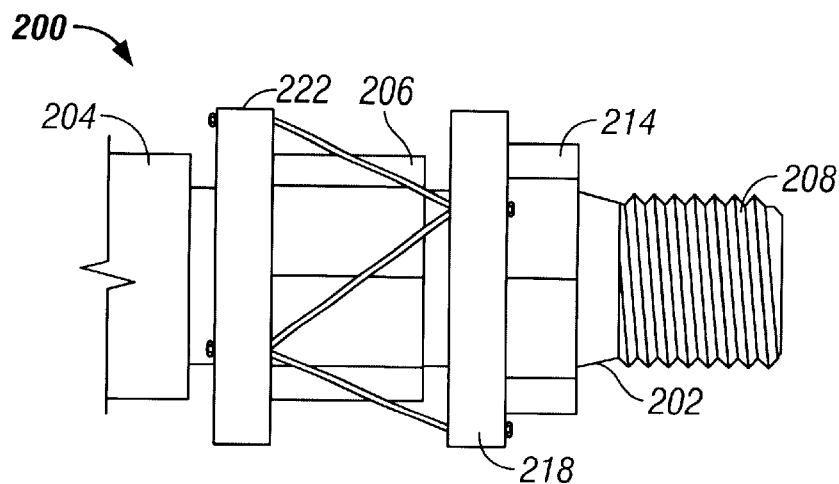

Referring also to FIGS. 5–7, several different support patterns may be used. For example, in FIG. 5, an x-pattern is shown in which supports 230 cross each other at some location along the path between the flanges 218, 222. The x-pattern may be used to provide equalization throughout the cross-section of the flanges 218, 222. In FIG. 6, a parallel-pattern is shown in which supports 230 never cross each other. In FIG. 7, a z-pattern is shown in which supports 230 cross each other at the clearance holes 220, 224. The z-pattern may be used if there isn't enough clearance on one side of the connector 200.

Figure 8:
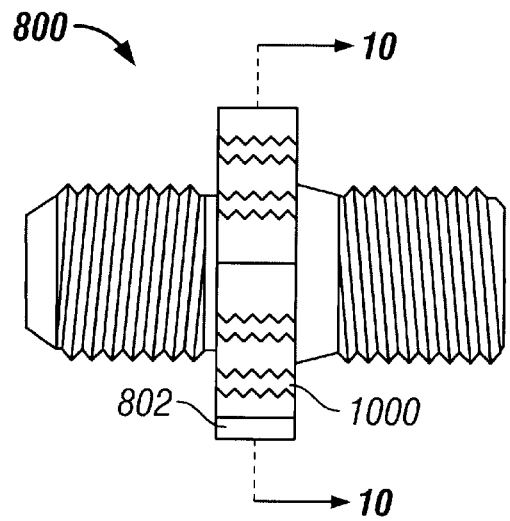
FIGS. 8 and 9 are side views of adapters that may be used in the fluid transfer device of FIGS. 2A and 2B.
Figure 9:
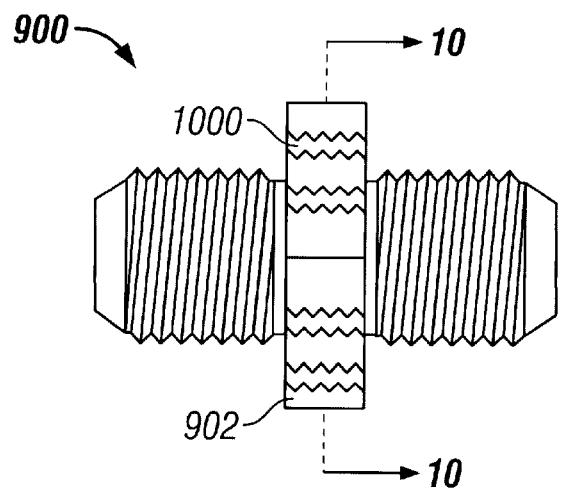
Figure 10:
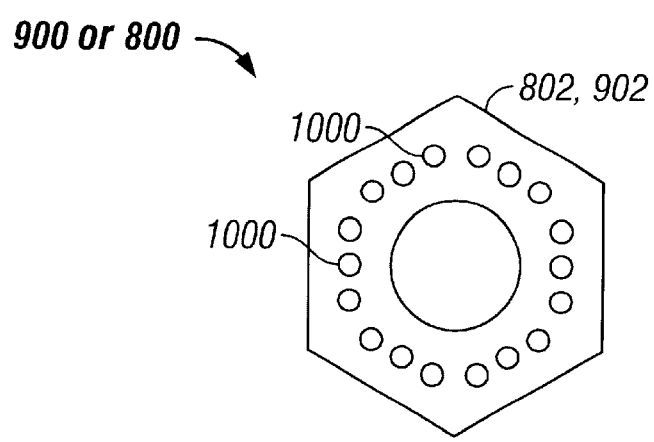
FIG. 10 is a cross sectional view of the adapters of FIGS. 8 and 9.

Referring also to FIGS. 8 and 9, other adapter designs are contemplated. For example, in FIG. 8, an adapter 800 is shown in which wrench flats are designed directly onto the flange 802. In FIG. 9, both ends of adapter 900 have similar thread designs, for example, straight threads, and the adapter 900 has wrench flats designed directly onto the flange 902. This type of adapter 900 may be used to connect two hoses together. As shown in FIG. 10, with the dual-usage flange design 802, 902, clearance holes 1000 may be sized or arranged in a different pattern. The dual-usage flange design 802, 902 is simpler in design than the single-usage flange design 218. Thus, the time needed to machine the adapter may be reduced.

Figure 11:
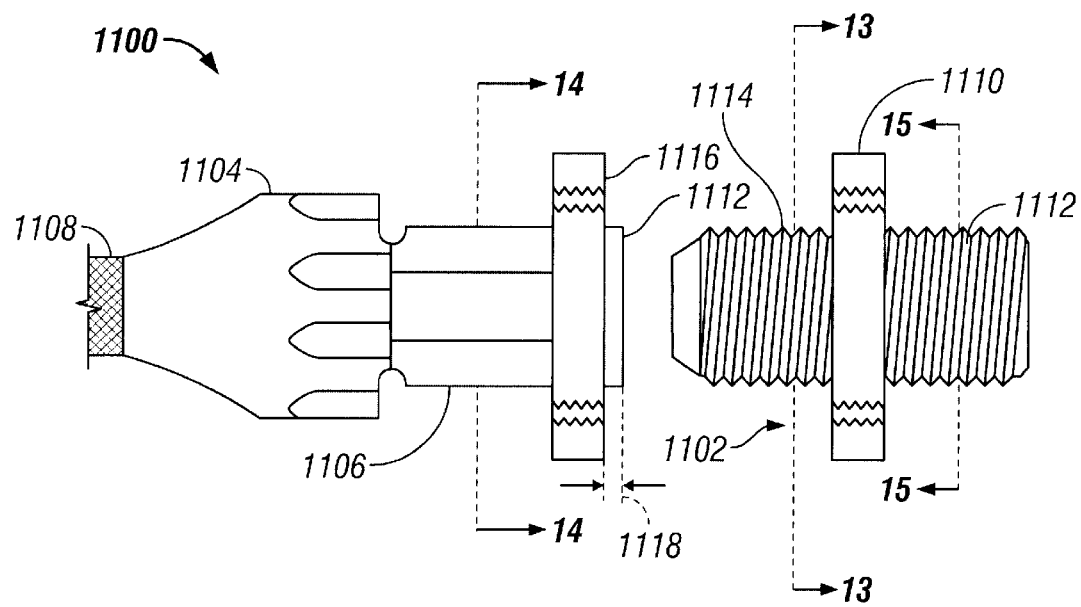
FIGS. 11 and 12 are side views of, respectively, a disassembled and assembled fluid transfer device.
Figure 12:
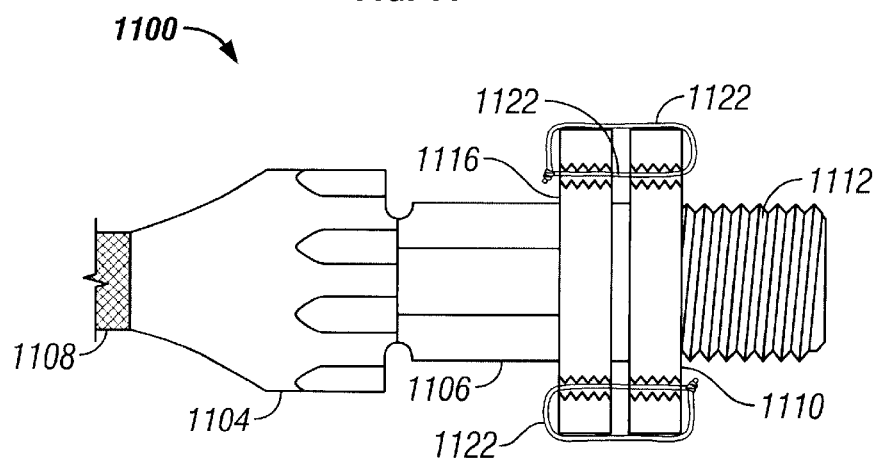

Referring also to FIGS. 11 and 12, a fluid transfer device 1100 may include an adapter 1102, a barb connector 1104, and a coupler 1106. The barb connector 1104 may be configured in a manner similar to barb connector 204. In general, a fluid hose 1108 joins to the barb connector 1104 as described above with respect to device 200. The adapter 1102 is designed with a flange 1110 positioned between external threads 1112 and external threads 1114.

A flange 1116 is formed on the coupler 1106 at a distance 1118 from an exposed end 1120 of the coupler 1106. Typically, the distance 1118 is made as small as it can be while still permitting proper connection between the flange 1116 and the flange 1110. In this way, a support 1122 connecting flange 1110 to flange 1116 has stability and durability when coupled between flanges 1110 and 1116. For a #10 size coupler 1106 and adapter 1102, this distance 1111 may be around 3/16 of an inch.

Flanges 1110 and 1116 may include clearance holes, as detailed above with respect to FIGS. 3 and 4.

Figure 13:
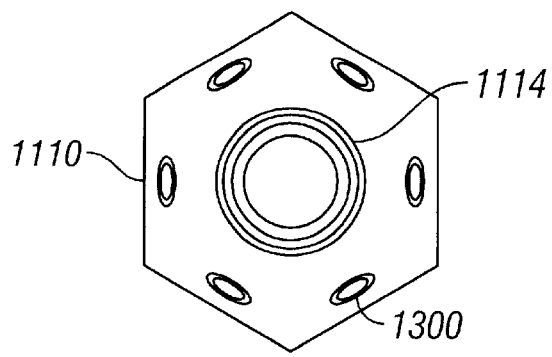
FIGS. 13–15 are cross sectional views of components of the fluid transfer device of FIGS. 11 and 12 taken along sections 13—13, 14—14, and 15—15 of FIG. 11.
Figure 14:
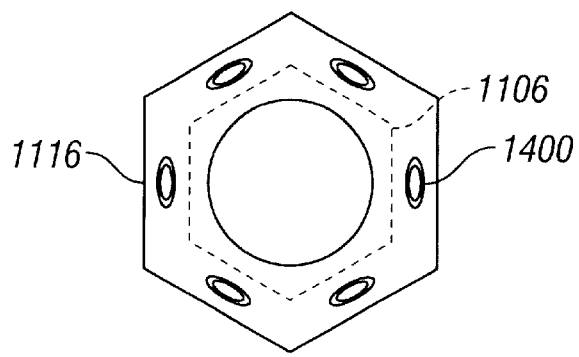
Figure 15:
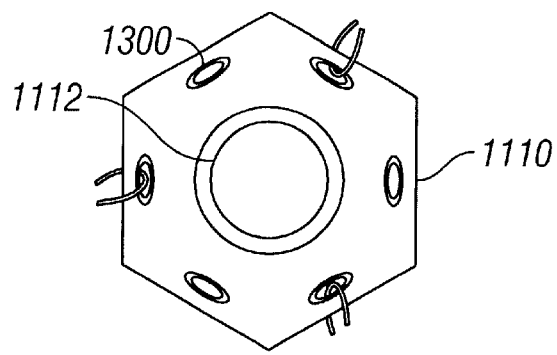

Referring also to FIGS. 13–15, flanges 1110 and 1116 may include with one or more routing slots 1300, 1400. The routing slots 1300 are positioned along a perimeter of the flange 1110 and routing slots 1400 are positioned along a perimeter of the flange 116.

As shown in FIG. 15, the support 1122 couples to three of the slots 1300 in flange 1110 in a 120° pattern. In this case, the support 1122 also couples to three of the slots 1400 in flange 1116 when joining the adapter 1102 to the coupler 1106.

Figure 16A:
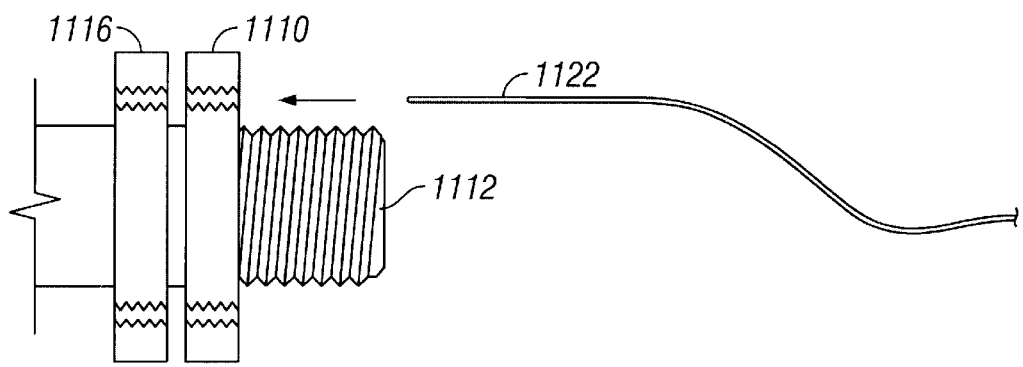
FIG. 16 shows a procedure for joining the components of the fluid transfer devices of FIGS. 2B and 12 using a support.
Figure 16B:
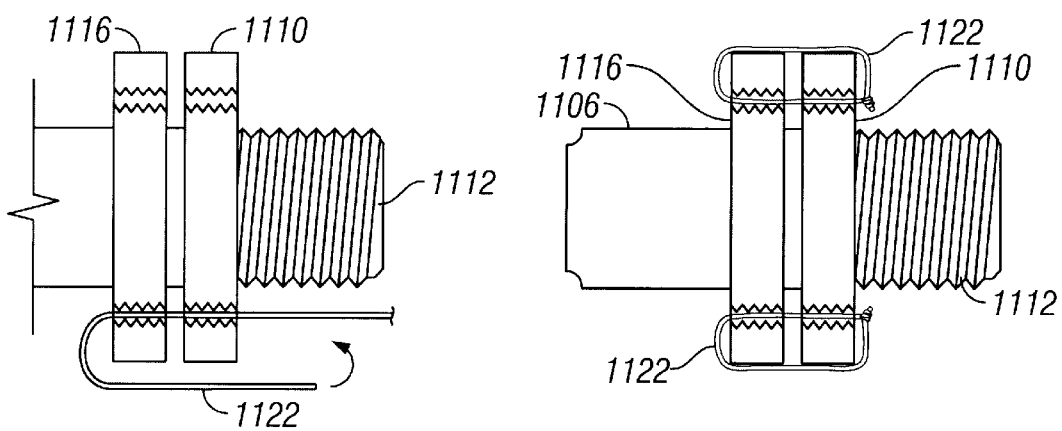
Figure 16C:
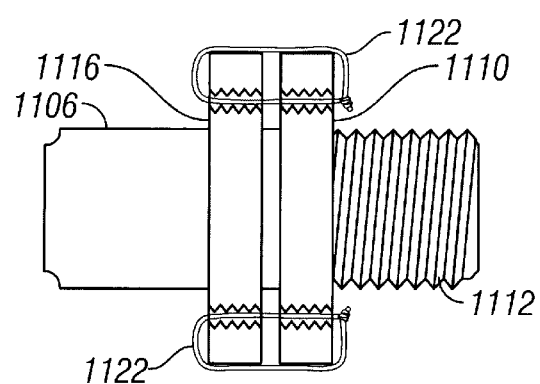

Referring also to FIG. 16, a procedure is shown for joining flange 1110 to flange 1116 using a support 1122 made of safety wire. Initially, the support 1122 is doubled for added strength (step A) and routed or sent through routing slots 1300 and 1400 (or through clearance holes for designs of FIGS. 3 and 4) (step B). In other implementations, the support 1122 may not be doubled or it may be doubled several times. After the support 1122 is routed through both routing slots 1300 and 1400, the ends of the support 1122 may be joined and tightened together (step C). If the support 1122 is safety wire, then safety wire twist pliers may be used to twist the ends of the safety wire together, thus pulling flanges 1110 and 1116 together into a tight fit.

Figure 17A:
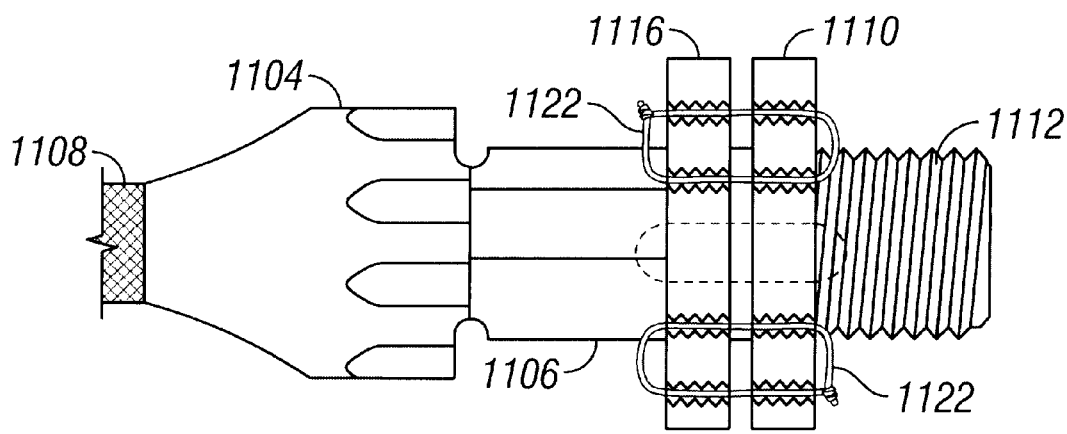
FIGS. 17A and 17B are, respectively, side and rear views of a support pattern used in the fluid transfer devices of FIGS. 2B and 12.
Figure 17B:
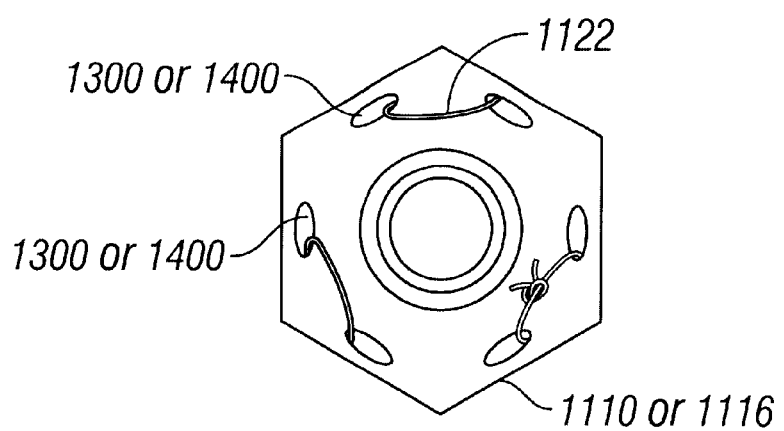

Referring also to FIGS. 17A and 17B, a straddle support pattern is shown. In the straddle pattern, the support 1122 is drawn through adjacent routing slots or holes to provide additional stability.

A number of embodiments of the invention have been described. Nevertheless, it will be understood that various modifications may be made without departing from the spirit and scope of the invention. For example, any type of external thread may be designed into the adapter 202, depending on the fluid transfer application.

Other support patterns may be used in the device 200 to secure the adapter 202 to the coupler 206. The support pattern may depend on the location and/or size of the device 200. Similarly, the flanges may be designed with any number of clearance holes. The number of clearance holes may depend on the size of the flanges or the location and/or size of the device 200.

Furthermore, any number of supports 230 may be secured through the clearance holes. Thus, for example, if there are twelve clearance holes on each of the adapter flange and the coupler flange, the number of supports 230 used to secure the adapter to the coupler may range from one to twelve.

The supports and flange/clearance hole design of the improved fluid transfer device described above may be used in any fluid transfer device in which one piece of the fluid transfer device may loosen relative to another piece of the fluid transfer device. In this manner, the flange/clearance hole design may be incorporated onto each of the joined pieces that may loosen during operation. The supports then could be threaded through each of the clearance holes, to prevent rotation of the first piece relative to the second piece.

The flange on the coupler may be positioned at any distance from the exposed end of the coupler, depending on the application for the fluid transfer device.

Other embodiments are within the scope of the following claims.

What is claimed is:

1. A fluid transfer device comprising:
   an adapter that includes a first flange with a first fastener on an outer diameter of the first flange;
   a connector;
   a coupler secured to the connector to rotate independently of the connector and to connect with an end of the adapter, the coupler including a second flange with a second fastener on an outer diameter of the second flange; and
   a support that couples the first and second fasteners of the first and second flanges to prevent relative rotation of the flanges so as to secure the adapter to the connector;
   in which the first flange is formed on the adapter.

2. The fluid transfer device of claim 1, in which the end of the adapter includes threads that match threads of the coupler.

3. The fluid transfer device of claim 1, in which the connector includes a barb connector in which a hose may be connected.

4. The fluid transfer device of claim 1, in which the first fastener includes a clearance hole through the first flange.

5. The fluid transfer device of claim 1, in which the second fastener includes a clearance hole through the second flange.

6. The fluid transfer device of claim 1, in which the first fastener includes a clip.

7. The fluid transfer device of claim 1, in which the second fastener includes a clip.

8. The fluid transfer device of claim 1, in which the first fastener includes a slot.

9. The fluid transfer device of claim 1, in which the second fastener includes a slot.

10. The fluid transfer device of claim 1, in which the support includes wire.

11. The fluid transfer device of claim 1, in which the support includes cable.

12. The fluid transfer device of claim 1, in which the first flange includes an additional first fastener and the second flange includes an additional second fastener.

13. The fluid transfer device of claim 12, further comprising an additional support that couples to the additional first and second fasteners of the flanges to help secure the adapter to the connector.

14. The fluid transfer device of claim 13, in which the support and the additional support cross each other at a location between the first flange and the second flange.

15. The fluid transfer device of claim 13, in which the support and the additional support are parallel to each other between the first flange and the second flange.

16. The fluid transfer device of claim 13, in which the support and the additional support cross each other at one or more of the first and second fasteners.

17. The fluid transfer device of claim 1, in which the support includes safety wire.

18. The fluid transfer device of claim 1, in which the support includes a knot.

19. The fluid transfer device of claim 1, in which the second flange is formed on the coupler.

20. A method of forming a fluid transfer device, the method comprising:
    securing a coupler to a connector that rotates independently of the coupler;
    connecting the coupler to an end of an adapter;
    routing at least one end of a support through a first fastener formed on an outer diameter of a first flange formed on the adapter;
    routing at least one end of the support through a second fastener formed at an outer diameter of a second flange formed on the coupler; and
    fastening the ends of the support that have been routed through the first and second fasteners;
    wherein the support couples the first and second fasteners of the first and second flanges to prevent relative rotation of the flanges so as to secure the adapter to the connector.

21. The method of claim 20, in which fastening the ends of the support includes tying knots in the ends of the support.

* * * * *